United States Patent [19]

Dubik et al.

[11] 4,112,295

[45] Sep. 5, 1978

[54] APPARATUS FOR DIRECT MEASUREMENT OF DISPLACEMENTS WITH A HOLOGRAPHIC SCALE

[75] Inventors: Adam Dubik; Henryk Zenon Kowalski; Pawel Osiennik; Franciszek Król, all of Warsaw, Poland

[73] Assignee: Instytut Geodezji i Kartograffi, Warsaw, Poland

[21] Appl. No.: 824,209

[22] Filed: Aug. 9, 1977

Related U.S. Application Data

[63] Continuation of Ser. No. 643,618, Dec. 22, 1975, abandoned.

[30] Foreign Application Priority Data

Dec. 30, 1974 [PL] Poland ................................. 176959

[51] Int. Cl.² ............................................... H01J 3/14
[52] U.S. Cl. ................................. 250/237 G; 356/169
[58] Field of Search ......... 250/231 R, 231 SE, 237 R, 250/237 G; 356/111, 169, 170

[56] References Cited

U.S. PATENT DOCUMENTS

| 2,406,299 | 8/1946 | Koulicovitch | 250/237 G |
| 3,482,107 | 12/1969 | Hock | 356/111 |
| 3,599,004 | 8/1971 | Grendelmeier | 356/169 |
| 3,738,753 | 6/1973 | Huntley | 250/237 G |

Primary Examiner—David C. Nelms
Attorney, Agent, or Firm—Haseltine, Lake & Waters

[57] ABSTRACT

Figure 2:
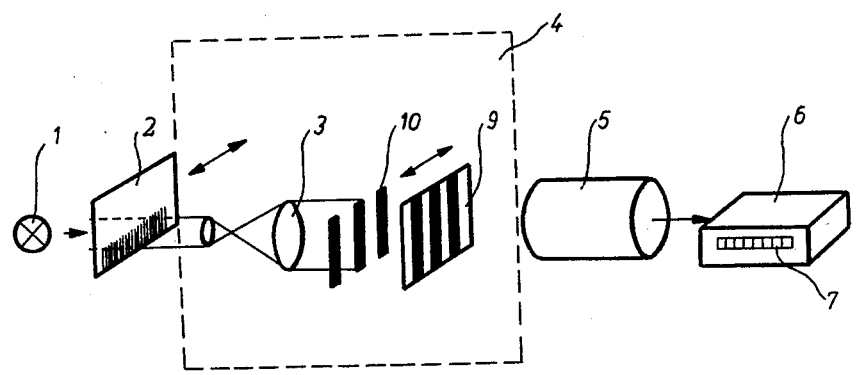

Apparatus for direct digital measurement of linear and angular displacements, shown in FIG. 2, is equipped with a holographical scale 2 with very high density of lines, and with a light pulse generator 4 the optical system 3 of which generates an enlarged image 10 of the scale, suited to the needs. The light pulse generator comprises also a striate diaphragm 9 arranged shiftably against the enlarged image 10 of the scale. The striate diaphragm 9 and the enlarged image 10 of the scale are identical and in the same scale. Displacing of the striate diaphragm against the enlarged image of the scale, generated by the optical system, causes covering of the inter-line space and generating of light pulses which are subsequently converted, for instance by means of a detector 5, into electrical pulses easy to be counted in the counting unit 6.

4 Claims, 4 Drawing Figures

APPARATUS FOR DIRECT MEASUREMENT OF DISPLACEMENTS WITH A HOLOGRAPHIC SCALE

This is a continuation of application Ser. No. 643,618 filed Dec. 22, 1975, now abandoned.

This invention relates to an apparatus for direct measurement of linear and angular displacements with digital readout.

In known apparatuses for measurement of displacements the essence of the measurement resolves itself to reading out the magnitude of the displacement on scales marked by mechanical, chemical, optical or magnetical means, whereat in order to increase the accuracy of the readout devices with auxiliary scales are applied, as verniers, micrometer screws, or optical devices in form of projectors and microscopes, which enlarge the scale.

The main inconveniences of appliances of said type consist in that the accuracy of the measurement depends on the limited resolutions of the scale and on considerable influence of subjective errors of the investigator.

There are known apparatuses, as for instance from the Polish Patent Specification No. 54755, providing a possibility of direct digital readout of linear or angular displacements. The readout accuracy and thus the measurement accuracy of said apparatuses is however limited by the accuracy of registering and readout, which for most accurate know apparatuses of said type does not exceed 500 bits per millimeter. The further increase of accuracy of measuring apparatuses demands to use special technical methods and additional readout devices, as electronical verniers and the like, which apart of increase of costs complicate the structure of the device and reduce simultaneously its operational dependability.

From the U.S. Pat. No. 3,552,861 an apparatus is known used for measurement of displacements of the units of machine tools, using therefor the diffraction grating. The accuracy of said apparatus is however also limited by the resolving power of the grating, which at known method of manufacturing it does not exceed several hundred marks or lines per 1 millimeter.

Also from the U.S. Pat. No. 3,578,979 an apparatus is known in which the displacement is determined through counting the light pulses generated by displacing graticules coupled with the member to be measured.

This invention is aimed at making possible the direct digital measurement of linear and angular displacements with simultaneous considerable increase of the accuracy of this measurement, as compared with results obtainable hitherto by means of known apparatuses.

The object of this invention has been achieved by constructing a measuring apparatus provided with a scale with very high density of lines marked with very light accuracy, and with a light pulse generator which admits a direct conversion of the linear or angular displacement of said scale into electric pulses. The examinations on the invention proved that the scale of this type preferably is to realize in form of an hologram that is by the way of photographical registering of the interference phenomenon of two coherent waves generated by a laser. That secures obtaining the scale density of the the order of several thousand graticule lines of the length of 1 millimeter, that is of such high resolving power of the graticule as it was not possible hithereto.

In order to make possible the conversion of displacements of scale with high density of lines the light pulse generator of the apparatus is equipped with an optical system which according to the need generates the enlarged image of the scale, and with a striate diaphragm arranged shiftably against the received enlarged image of the scale. The striate diaphragm consists of a photographically registered image with enlargement and scale identical as those of the enlarged image of the scale.

The displacement of the striate diaphragm against the enlarged image of the scale, generated by the optical system, causes a covering by lines of one of said members the interline spaces of the other one, and thus generating in known way light pulses the number of which is direct proportional to the displacement to be measured. Then the light pulses are converted in known way, for instance by means of a detector, into corresponding therewith electric pulses being easily countable. The principle of generating the light pulses is known indeed from the U.S. Pat. No. 3,578,979 mentioned as prior art, but in the apparatus according to the present invention there is used an hitherto unknown mutual displacement of the enlarged image of the scale and the striate diaphragm being a photographical registration of said image. Thus the diffraction phenomenon has been eliminated what makes possible to achieve distinct light pulses at considerably higher density of the measuring graticule lines. Thus a corresponding increase of the measuring accuracy has been achieved.

Figure 1:
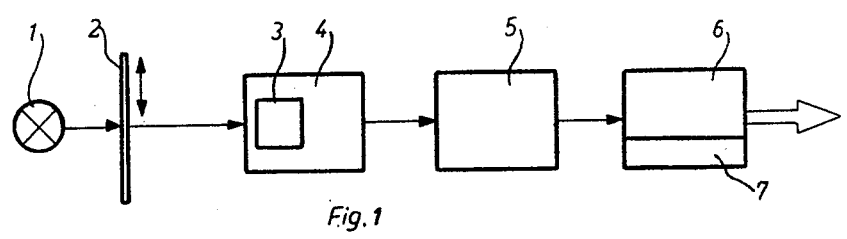
Figure 3:
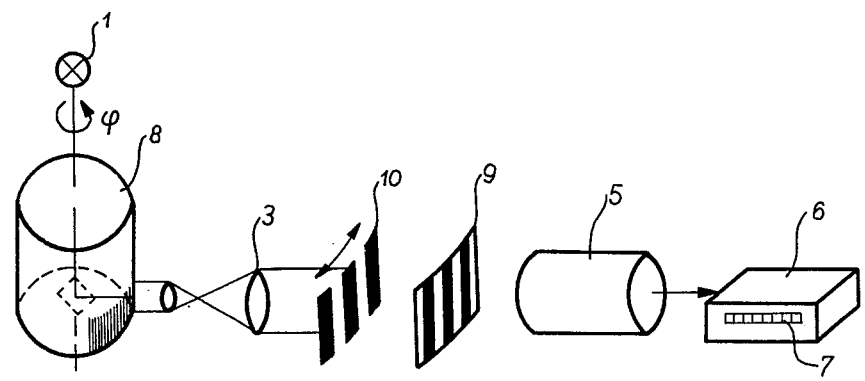
Figure 4:
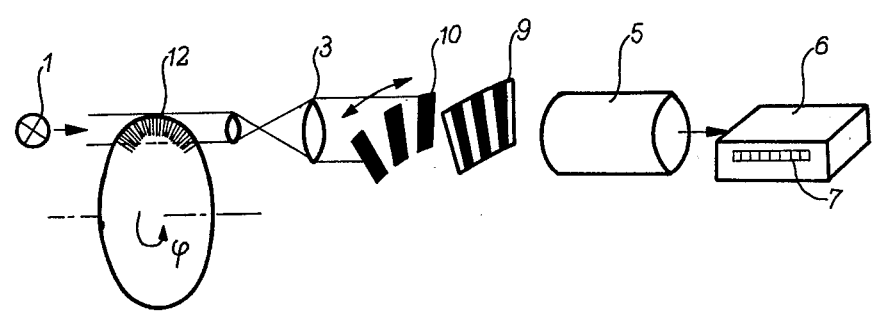

The invention will be now specified more particularly by means of an exemplary embodiment with reference to the accompanying drawing in which FIG. 1 is the block diagram of the apparatus for direct digital measurement of linear and angular displacements, FIG. 2 is the schematic diagram of the apparatus according to the invention for digital measurement of linear displacements, FIG. 3 is the schematic diagram of the apparatus for direct digital measurement of angular displacements with peripheral scale, and FIG. 4 is the schematic diagram of the apparatus according to FIG. 3 but with radial scale.

The apparatus for direct digital measurement of linear and angular displacements, the block diagram of which is shown in FIG. 1, consists of the following units: — radiation source 1 which illuminates the scale 2 with lines of high density, a light pulse generator 4 containing the enlarging optical system 3, a detector 5, an unit 6 for counting the electrical pulses and a display unit 7 for digital indication of the result.

In the exemplary embodiment of the apparatus according to the invention shown in FIG. 2 the radiation source 1 constitutes the light source, it is however possible to employ other radiation sources, as for instance of infra-red radiation, if it is determined by the operational conditions of the apparatus. In this case, the detector 5 must be suited to the used radiation kind.

The optical system 3 is aimed at generating the enlarged image 10 of the scale 2. The light pulse generator 4 is equipped with the striate diaphragm 9 which is the photographically registered enlarged image of the scale 2, identical and in the same scale as the enlarged image 10.

The detector 5 is the known silicon diode converting the light pulses inciding on its active surface into corresponding electrical pulses.

The counting unit 6 counts the electrical pulses entering onto its input, which as the final result of the measurement are in digital form shown in the display unit 7. The operational mode of the apparatus according to the invention is as follows:

The element the displacement magnitude of which is to be measured is coupled with the scale 2 or the striate diaphragm 9 what causes corresponding displacement of the scale or the striate diaphragm against each other. During the travel of the for instance the enlarged image 10 in relation to the striate diaphragm 9 it follows a subsequent covering and uncovering of the inter-line spaces of the striate diaphragm 9 by the lines of the enlarged image 10. The number of thus generated light pulses is directly proportional to the magnitude of the displacement being measured.

As the light pulses are generated in result of simultaneous covering of a number of inter-line spaces of the striate diaphragm 9 by lines of the enlarged image 10, displaced against the former lines, a high reliability of discriminating the single lines of the scale is achieved, and thus a dependability of the measurement readout.

Each light pulse inciding onto the active surface of the detector 5 gets converted then into an electrical pulse. The electrical pulses are then counted by the counting unit 6 an the result on being divided by the number of pulses corresponding with the unit of displacement is shown on the display unit 7 as the result of the measurement.

FIG. 3 shows an apparatus in which the scale 8 in form of an hologram is placed on the periphery of a cylinder coupled with the element which angular displacement is to be measured. In this case the striate diaphragm 9 of the apparatus is the photographical registration of the enlarged image of a section of scale being placed on the cylinder, whereby the operational mode of the apparatus is identical as for that shown in FIG. 2.

As shown in FIG. 4 the apparatus can be provided with a scale 12 placed on the periphery of a disc and having a form of radially arranged lines. In this case the striate diaphragm 9 is a registered photographically enlarged image of the scale 12.

Due to the possibility of direct converting of the pulses obtained in result of displacements of the scale 2, 8 or 12 into light pulses, as employed in the apparatus according to the invention, and then of converting the light pulses into corresponding therewith electrical pulses easy to be counted, enables a direct and quick digital readout of the result of measurement.

The apparatus admits moreover to perform measurements of displacements within a very wide range of velocities. By combining with suitable unit of time relating the apparatus enables to measure in a simple way velocity, acceleration or derivatives of various orders, measured by displacement of physical quantities. Thus the apparatus according to the invention can be employed as the direct unit coupled with a computer used to controlling of various technical processes.

Employing in the apparatus of an additional unit, namely the digital-to-anlog converter makes possible to present the displacements in analog form.

What is claimed is:

1. Apparatus for direct digital measurement of linear and angular displacement, comprising: a holographic scale of a density from several hundred to several thousand lines per millimeter, an optical system discriminating against zero order diffraction line order from said scale, a striated diaphragm comprising a magnified pattern of zero order diffraction lines orders of said scale, and a detector transforming light pulses generated due to mutual displacement of the scale and diaphragm into corresponding electrical pulses, said holographic scale being located so as to fill completely the transmission field of the optical system.

2. Apparatus as claimed in claim 1, wherein said scale is flat, the lines of the said scale being parallel to each other.

3. Apparatus as claimed in claim 1, wherein said scale is plotted on a cylindrical body, the lines of the said scale being parallel to each other.

4. Apparatus as claimed in claim 1, wherein said scale is plotted on the periphery of a disk, the lines of the said scale being radial.

* * * * *